Patented Dec. 8, 1942

2,304,064

UNITED STATES PATENT OFFICE 2,304,064

PROCESS FOR PRODUCING ALDEHYDES

John T. Scanlan, Wyndmoor, and Daniel Swern, Melrose Park, Pa., assignors to Claude L. Wickard, as Secretary of Agriculture of the United States of America, and to his successors in office No Drawing. Application April 28, 1942, Serial No. 440,878

3 Claims. (Cl. 260—601)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This application is in part a continuation of our copending application Serial No. 302,602 filed November 2, 1939, Patent No. 2,285,059.

This invention relates to organic compounds and is directed more particularly to the production of derivatives from compounds comprising an acyclic carbon chain containing at least three carbon atoms.

According to the present invention the ethylenic linkage (—CH=CH—) of an unsaturated acyclic carbon chain containing at least three carbon atoms is converted to an alpha-glycol group, and aldehydes are produced by oxidation of compounds containing an alpha-glycol group with concomitant cleavage of the acyclic carbon chain between the carbon atoms of the alpha-glycol grouping.

Our process is applicable to the production of alpha-glycols and of aldehydes from unsaturated alcohols, unsaturated fatty acids, unsaturated carboxylic esters, and from materials consisting of or comprising such unsaturated compounds.

Thus we may use as starting materials such relatively inexpensive and readily available substances as ester-type waxes and oleaginous materials of animal or vegetable origin for example lard, lard oil, cottonseed oil, peanut oil, olive oil, or fractions thereof obtainable for instance by crystallization or solvent extraction. Our invention is also applicable to the treatment of constituents or derivatives of these natural products, for instance of unsaturated fatty acids like oleic, ricinoleic or lineoleic acid, their esters with polyhydric alcohols such as the glycerides, or with monohydric alcohols like methyl, ethyl, propyl, butyl esters.

Unsaturated alcohols containing ethylenic linkages such as for example oleyl alcohol or esters of these alcohols with fatty acids may also be converted to aldehydes or to intermediate products by our process.

Our process is not limited, however, to the treatment of naturally occurring compounds or of their derivatives but may be applied to the treatment of any aliphatic unsaturated alcohol, carboxylic acid or carboxylic acid ester containing an ethylenic linkage and at least 3 carbon atoms, and to the products obtained from the aforementioned aliphatic compounds by conversion of the ethylenic linkage to an alpha-glycol group, by any suitable procedure.

The aldehydes produced by our process may also contain other functional groups in their molecule such as for example, ketone, aldehyde, carboxyl, or hydroxyl groups, depending upon the nature of the starting material.

The aldehydes obtained by our process are useful as components or intermediate products in the manufacture of various products such as for example perfumes, flavoring materials, vulcanization accelerators, pharmaceuticals, plastics, resins, plasticizers, artificial fibers and other synthetic products.

According to the present invention the unsaturated compounds are hydroxylated by a treatment with a mixture of 30% hydrogen peroxide and glacial acetic acid, thereby converting the ethylenic linkages to alpha-glycol groups according to the following equation:

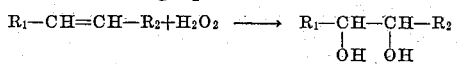

Heretofore the usual method of performing this reaction consisted in mixing the unsaturated compound with glacial acetic acid and 30% hydrogen peroxide either at room temperature or with application of heat. At room temperature the reaction proceeds very slowly and requires considerable time, usually about a week, for completion. If the mixture is heated the reaction velocity is not substantially increased until the temperature approximates 100° C. whereupon a violent exothermic reaction occurs which is extremely difficult to control especially when operating on a fairly large scale. The temperature of the mixture rises rapidly and violent ebullition takes place. This sudden evolution of heat not only causes considerable losses of hydrogen peroxide which decomposes at higher temperatures, but also promotes the formation of acetylated alpha-glycol groups which do not readily undergo scission on subsequent treatment.

We have discovered that the hydroxylation reaction proceeds rapidly at moderate temperatures if prior to the addition of the unsaturated compound the mixture of glacial acetic acid and 30% hydrogen peroxide is maintained at 80–85° C. for about one hour, and then cooled to substantially room temperature. When the unsaturated compound is introduced into this cooled mixture, the hydroxylation reaction proceeds rapidly and is completed within a relatively short period of time without application of heat. Under these conditions the exothermic nature of the process is mitigated to such an extent that most of the heat evolved is dissipated by radiation and whenever necessary the temperature of the batch may be readily controlled by adequate cooling.

The hydroxylated compounds are then converted to aldehydes by treating them with red lead ($Pb_3O_4$) and glacial acetic acid.

This step of our process can be carried out without isolating the hydroxylated compounds from the products of the hydroxylating reaction, and may be effected by adding the necessary amount of glacial acetic acid and red lead to the mixture.

Red lead appears to react with acetic acid to form lead tetracetate which interacts as rapidly as it is formed with the compound containing an alpha-glycol group, splitting the carbon chain between the adjacent carbon atoms linked to the hydroxyl groups and yielding aldehydes according to the following equation wherein the reaction is illustrated as applied to a compound comprising one alpha-glycol group.

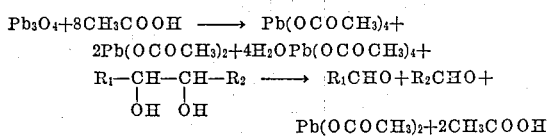

The method of our invention thus obviates the necessity of isolating and purifying the unstable lead tetracetate.

When our process is operated without isolating the hydroxylated intermediate product or products the hydrogen peroxide present in the reaction mixture has no detrimental effect on the process and is believed to be decomposed by the action of red lead prior to the formation of aldehydes.

In some cases it may be advantageous to isolate the hydroxylated compounds, or to subject them to a thermal treatment in the presence of alkalies, thereby effecting the hydrolysis of any acetyl groups which are usually formed when the hydroxylation is performed in the presence of acetic acid. Since lead tetracetate does not react with alpha-glycol groups containing substituted hydroxyl groups the elimination of acetyl groups increases the yields of aldehydes on subsequent treatment with red lead and glacial acetic acid.

It is to be understood of course that our invention is not limited to the treatment of hydroxylated compounds obtained by any of the foregoing procedures. The reaction with red lead and glacial acetic acid is applicable to the production of aldehydes from compounds containing alpha-glycol groups produced by other methods, such as for example treatment of unsaturated compounds with potassium permanganate or with persulfuric acid.

The aldehydes obtained may be isolated by any suitable means such as for instance steam distillation or solvent extraction.

Acetic acid and lead acetate may be recovered, and also other byproducts of the process such as for example glycerol which is formed when the process is applied to the treatment of glyceryl esters.

As illustrative embodiments of a manner in which our invention may be carried out in practice the following examples are given:

*Example 1*

1800 cc. of glacial acetic acid and 567 grams of 30% hydrogen peroxide were mixed together and heated on the steam bath at approximately 85° C. for one hour. The mixture was then cooled to about 25° C. and added to 706 grams of oleic acid. With occasional agitation the ensuing exothermic reaction was allowed to proceed without application of heat. In 40 minutes the temperature had risen to 65° C. and at that temperature the oily layer disappeared and the solution became homogeneous and clear. The temperature then began to fall very slowly and the mixture was allowed to stand over night at room temperature. It was filtered cold to remove a small quantity of a waxy solid, poured into 6,000 cc. of hot $H_2O$, and the aqueous layer was siphoned off and discarded. The residual oil was dissolved in 750 cc. of 6N NaOH and 4000 cc. of water and heated two hours on the steam bath. It was then heated to boiling, removed from the heat and acidified with 6N HCl. The oil thrown out of the hot solution solidified on cooling, was separated from the aqueous layer, remelted and thoroughly washed with about 3000 cc. of boiling water. The mixture was allowed to cool, the solidified product separated, dried for a day over anhydrous calcium chloride and recrystallized from alcohol. Yield 353 grams of 9,10-dihydroxystearic acid: M. P., 89–90° C. Neutralization equivalent, 316.4 (theory 316.3).

63 grams of this purified 9,10-dihydroxystearic acid were dissolved in 500 grams of glacial acetic acid at 55°–65° C. Maintaining the temperature within that range, 151 grams of finely powdered, ordinary red lead ($Pb_3O_4$) were added in small portions. Each successive portion was added only after the previous one had been completely decolorized. When all the red lead had been added the solution was diluted with 500 cc. of water and steam distilled. The pelargonic aldehyde, a colorless oil, was separated from the distillate mechanically, or by extracting with an immiscible solvent, such as ether, washed with dilute alkali, then with water and dried. The yield was about 20 grams. 70% of theory based upon dihydroxystearic acid, 31.5% based upon oleic acid. The residue from the steam distillation was extracted with an immiscible solvent, such as ether, the ether extract washed with water until free from lead and dried. Evaporation of the solvent yielded a pale yellow oil, the half-aldehyde of azelaic acid. The yield was about 22 grams, 64% of theory.

*Example 2*

Dihydroxystearic acid was prepared by hydroxylating 282 grams of oleic acid as described in Example 1, but omitting the final recrystallization from alcohol. The product after being air-dried weighed 288 grams. This material was dissolved in 2200 cc. of glacial acetic acid, heated to 55–65° C. and while maintaining the temperature within that range, 754 grams of red lead ($Pb_3O_4$) were added in small portions. When the reaction was complete the reaction mixture was diluted with 1500 cc. of water and steam distilled. The pelargonic aldehyde was separated from the distillate by extraction with ether, and purified by consecutive washing with water, sodium bicarbonate solution and again with water, and then dried over anhydrous calcium sulfate. The ether was removed by evaporation under reduced pressure. Yield 51 grams of pelargonic aldehyde, or 36% of theory, based on the oleic acid used.

The steam distillation residue was extracted with ether, washed free of lead with water, the ether was removed by evaporation under reduced pressure, and the residue was dissolved in sufficient 5% sodium hydroxide to give a solution having a pH value of 8-9. A solution of 92 grams of potassium permangante in 1100 cc. of water was added at room temperature as rapidly as possible to this alkaline solution with vigorous agitation, but with care to prevent loss by foaming. The temperature of the mixture rose rapidly to about 70° C. The stirring was continued until fifteen minutes after the disappearance of the permanganate color. After standing over night the manganese dioxide was removed by filtration, washed thoroughly with boiling water, and the combined filtrate and washings were acidified with sulfuric acid and chilled in the refrigerator. The small quantity of oil, which separated on acidification, solidified and was easily removed mechanically. The crystals of azelaic acid which also separated on cooling were redissolved by heating the solution on the steam bath and the solution was concentrated to about two liters, boiled a short time with a small quantity of decolorizing charcoal, filtered and cooled in the refrigerator. The crystals of azelaic acid were filtered and washed, and recrystallized from water. Yield 11 grams, 6% of the theory, based on oleic acid used. M. P. 104-106° C.

*Example 3*

720 cc. of glacial acetic acid and 225 grams of 30% hydrogen peroxide were mixed and heated for one hour at 80-85° C. The mixture was cooled to 25° and 282 grams of oleic acid were added to it at that temperature. The ensuing exothermic reaction was allowed to proceed with occasional agitation. In 30 minutes the temperature had risen to 65° C. and the solution was homogeneous. After about 15 minutes the temperature began to fall slowly. After standing over night this reaction mixture was diluted with 1480 cc. of glacial acetic acid, heated to 55-65° C. and 754 grams of finely powdered red lead were added in small portions. When a test indicated that the oxidizing agent was exhausted the mixture was steam distilled. The pelargonic aldehyde was extracted from the distillate with ether. The ether solution was washed with water, saturated sodium bicarbonate solution, again with water, dried over anhydrous calcium sulfate, filtered and the ether removed by evaporation. Yield 33 grams, 23% of theory.

*Example 4*

720 cc. of glacial acetic acid and 225 grams of 30% hydrogen peroxide were mixed and heated for one hour at 80-85° C. The solution was cooled to 25° C. and 310 grams of ethyl oleate were added. The mixture was agitated occasionally and in the course of an hour the temperature rose to 61° C. but the mixture did not become homogeneous. An additional 400 cc. of glacial acetic acid was heated to 60° C. and added which gave a clear, homogeneous solution. After the solution had stood over night, 1080 cc. of glacial acetic acid were added, and the solution was heated to 55-65° C. The oxidation with red lead was carried out as described in Example 3. The clear solution was diluted with 1000 cc. of water and steam distilled. The distillate was extracted with ether, the ether solution was washed twice with water, then with sodium bicarbonate solution and again with water until neutral. The ether solution was dried over anhydrous calcium sulfate, filtered, and the ether removed by evaporation. Yield of pelargonic aldehyde, 47 grams, 33% of theory. The steam distillation residue was extracted with ether. This ether solution was treated in the same manner as was the ether extract of the distillate. The residue was vacuum distilled. Yield of the pure ethyl ester of azelaic half aldehyde, 25 grams, 12.5% of theory.

*Example 5*

Both the high-melting and low-melting forms of the ethyl ester of dihydroxystearic acid were prepared by esterifying with ethyl alcohol, the crude dihydroxystearic acids obtained by hydroxylating oleic acid with potassium permanganate in aqueous alkaline solution, and 30% hydrogen peroxide in acetic acid solution, respectively. In the subsequent treatment no difference was observed in the behavior of the two forms of the ester. 69 grams of ethyl-9,10-dihydroxystearate were treated with red lead in the same manner as described in Example 1. Pelargonic aldehyde was recovered as a colorless oil from the steam distillate. The yield was 25 grams, 83% of theory. The residue yielded about 33 grams, 83% of theory, of pale yellow oil, the ethyl ester of the half-aldehyde of azelaic acid.

Pelargonic aldehyde and the methyl ester of the half-aldehyde of azelaic acid were obtained by substituting in Examples 4 and 5 ethyl oleate and the ethyl ester of dihydroxystearic acid by the equivalent amounts of methyl oleate and the methyl ester of dihydroxystearic acid.

*Example 6*

225 grams of 30% hydrogen peroxide and 820 cc. of glacial acetic acid were mixed and heated for one hour at 80-85° C. The solution was cooled to 25° C. and mixed with 311 grams of castor oil. The mixture was agitated occasionally and the temperature rose to 66° C. in about 30 minutes becoming homogeneous at about 59° C. The temperature began to fall slowly and the solution was stirred mechanically about two hours and allowed to cool to room temperature. An additional 1380 cc. portion of glacial acetic acid was added, the solution was heated to 55°-65° C. and 754 grams of finely powdered red lead were added in small portions. The reaction mixture was steam distilled and the distillate was extracted with ether. The ether solution was washed with water, sodium bicarbonate solution and again with water, dried with anhydrous calcium sulfate, and evaporation of the ether yielded 47 grams of alpha-nonenaldehyde.

The residue was extracted with ether, the ether solution was washed free of lead, and the ether evaporated. The residual oil was dissolved in 1000 cc. of glacial acetic acid and 225 grams of 30% hydrogen peroxide were added. The mixture was allowed to stand about 24 hours then heated on the steam bath until the temperature stopped rising and then removed. The acetic acid was distilled off with steam, the supernatant aqueous layer was poured off and the residue was neutralized with 25% sodium hydroxide solution. The mixture was refluxed three hours with a 1000 cc. excess of 6N NaOH. It was then acidified with sulfuric acid while hot, and the aqueous layer was immediately removed by filtration. The filtrate was boiled with a small portion of a decolorizing charcoal to remove the small quantity of oil which came through the filter, filtered hot and allowed to cool. The azelaic acid separated as small, white crystals. Yield about 26 grams.

Example 7

720 cc. of glacial acid and 225 grams of 30% hydrogen peroxide were mixed together and heated on the steam bath at approximately 85° C. for one hour. The solution was then cooled to room temperature and added to 268.5 grams of oleyl alcohol. With occasional stirring the ensuing exothermic reaction was allowed to proceed without application of heat. In 30 minutes the temperature had risen to 72° C. and the solution was homogeneous and clear. The temperature then began to fall very slowly and the mixture was allowed to stand over night at room temperature. The solution was then poured into 2400 cc. of hot water and the aqueous layer was discarded. The residual oil was neutralized with 1N alcoholic KOH and an additional 1000 cc. of 1N alcoholic KOH was added. After refluxing for two hours, the alcohol was removed and the product was separated as an oil by dilution with hot water, followed by vigorous stirring. The aqueous layer was discarded and the oil was washed thoroughly with hot water. After cooling, the solidified oil was separated from the wash water, broken up and air-dried. The dry product was crystallized from ethyl acetate. Yield, 138 grams of 9,10-dihydroxyoctadecanol-1 (46%).

The oxidation of 9,10-dihydroxyoctadecanol-1 was carried out as described in Example 1 for 9,10-dihydroxystearic acid using 151 grams of 9,10-dihydroxyoctadecanol-1, 1230 cc. of glacial acetic acid and 377 grams of red lead. When all the red lead had been added, the reaction mixture was diluted with a large excess of water and extracted twice with ether. The combined ether extracts were washed with water until free from lead salts and acetic acid, dried over calcium sulfate, and the ether was evaporated. The residue was vacuum distilled yielding 50 grams of pelargonic aldehyde, 70% yield based on 9,10-dihydroxyoctadecanol-1 and 40 grams of 9-hydroxypelargonic aldehyde, 51% yield on the same basis.

Example 8

9,10-dihydroxyoctadecanol-1 was prepared as described in Example 7, except that the recrystallization from ethyl acetate was omitted. The product after being air-dried weighed 270 grams. This material was oxidized as described in Example 2 for crude 9,10-dihydroxystearic acid. When all the red lead had been added the reaction mixture was treated as described in Example 7. In this manner, 38 grams of pelargonic aldehyde and 36 grams of 9-hydroxypelargonic aldehyde were obtained.

We claim:

1. The process for producing aldehydes which comprises hydroxylating the ethylenic linkage of an unsaturated aliphatic alcohol containing eighteen carbon atoms by reacting said alcohol at temperatures ranging from 25° to 80° C. with the product obtained by heating a mixture of glacial acetic acid and 30% hydrogen peroxide solution for substantially one hour at temperatures ranging from 80° to 85° C. and subsequently reacting the hydroxylated compound with red lead and glacial acetic acid at temperatures of substantially 55–65° C.

2. The process for producing aldehydes which comprises reacting an aliphatic compound containing eighteen carbon atoms, an alpha glycol group and an alcohol group with red lead and glacial acetic acid at temperatures of substantially 55–65° C.

3. The process as defined in claim 1, wherein the unsaturated aliphatic alcohol is oleyl alcohol.

JOHN T. SCANLAN.
DANIEL SWERN.